July 12, 1955
W. R. ISOM
2,712,771
FILM INTERMITTENT ADVANCING MECHANISM
Filed April 30, 1952
2 Sheets-Sheet 1
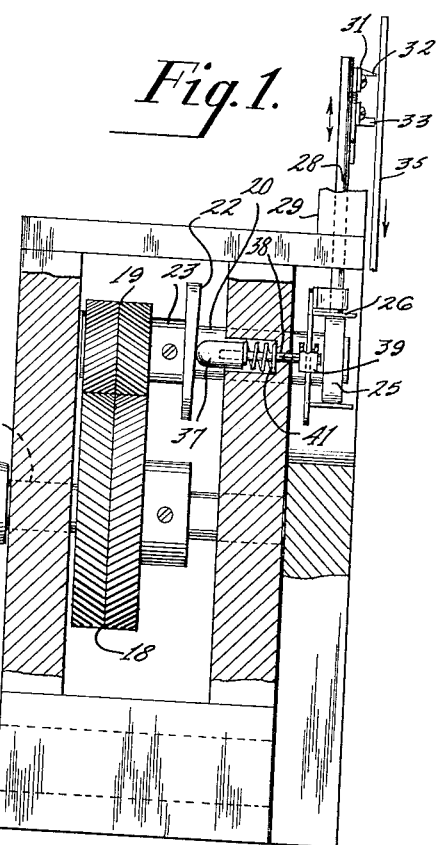
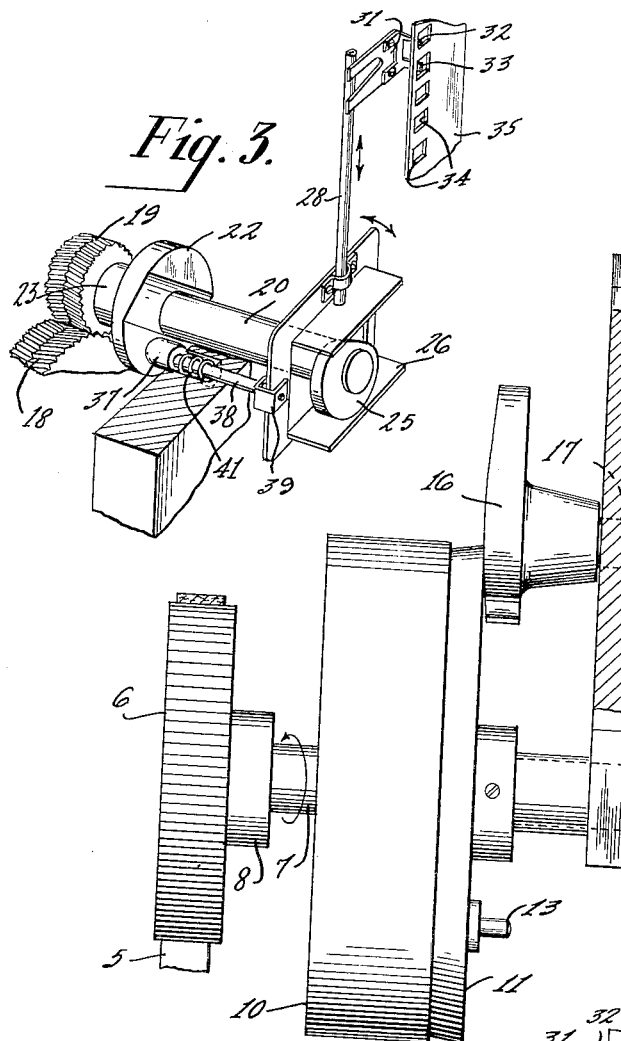
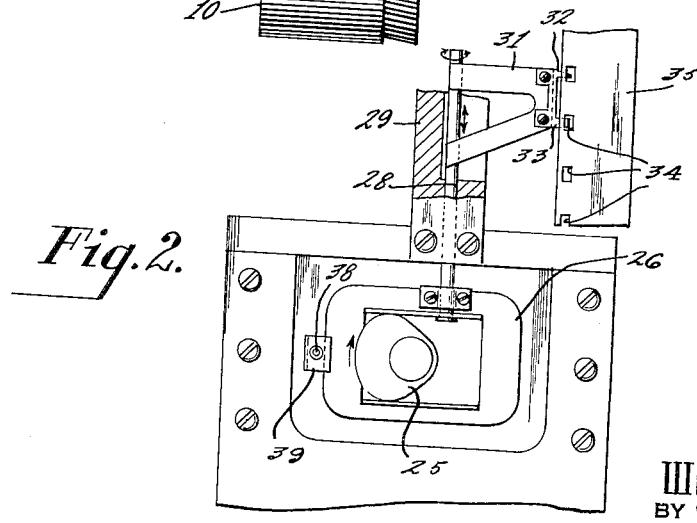
INVENTOR
Warren R. Isom
BY
ATTORNEY July 12, 1955

W. R. ISOM 2,712,771

FILM INTERMITTENT ADVANCING MECHANISM

Filed April 30, 1952

INVENTOR
Warren R. Isom
BY
ATTORNEY

United States Patent Office 2,712,771
Patented July 12, 1955

2,712,771

FILM INTERMITTENT ADVANCING MECHANISM

Warren R. Isom, West Collingswood, N. J., assignor to Radio Corporation of America, a corporation of Delaware Application April 30, 1952, Serial No. 285,209

11 Claims. (Cl. 88—18.4)

This invention relates to motion picture film apparatus, and particularly to motion picture camera or projector intermittent advancing mechanisms for film.

It is well-known that motion picture cameras utilize intermittent film advancing mechanisms. The two better known types of these mechanisms are the Geneva intermittent using a pin wheel—star wheel combination and the cam-claw type. With the advent of kinescope photography, whereby the camera photographs television pictures on kinescope tubes, a special form of camera is desirable. For transmitting motion picture film, the projector should have a special film advancing mechanism. This is because television transmission is based on thirty frames per second, which requires sixty vertical blanking pulses per second, and motion pictures are photographed and projected at twenty-four frames per second. Thus, if the film can be advanced during blanking periods of substantially 1.336 milliseconds, the two systems can be made so completely compatible that simultaneous pick-up devices are totally successful. Furthermore, dependence upon storage type pick-up tubes with their attendant shading difficulties is no longer necessary for deriving video signals from motion picture film.

The present invention, therefore, is directed to a serially arranged combination of the Geneva and claw types of pull-down film mechanisms which provide the desired film advancing cycle for television purposes. The use of a shutter is avoided, which permits a better utilization of a light source.

The principal object of the invention, therefore, is to facilitate the advancement of motion picture film in a camera and projector.

Another object of the invention is to provide an improved film advancing mechanism for cameras and projectors.

A further object of the invention is to provide an improved film pull-down mechanism at twenty-four frames per second, which is compatible with the vertical blanking time of a thirty-frame television system.

A still further object of the invention is to provide an improved film pull-down mechanism combining Geneva and claw types of mechanisms in series.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is an elevational view, partly in cross-section, of a film pull-down mechanism embodying the invention.

Fig. 2 is a front elevational view of the claw type portion of the mechanism embodying the invention.

Fig. 3 is a perspective view of the claw type portion of the invention.

Figure 4:
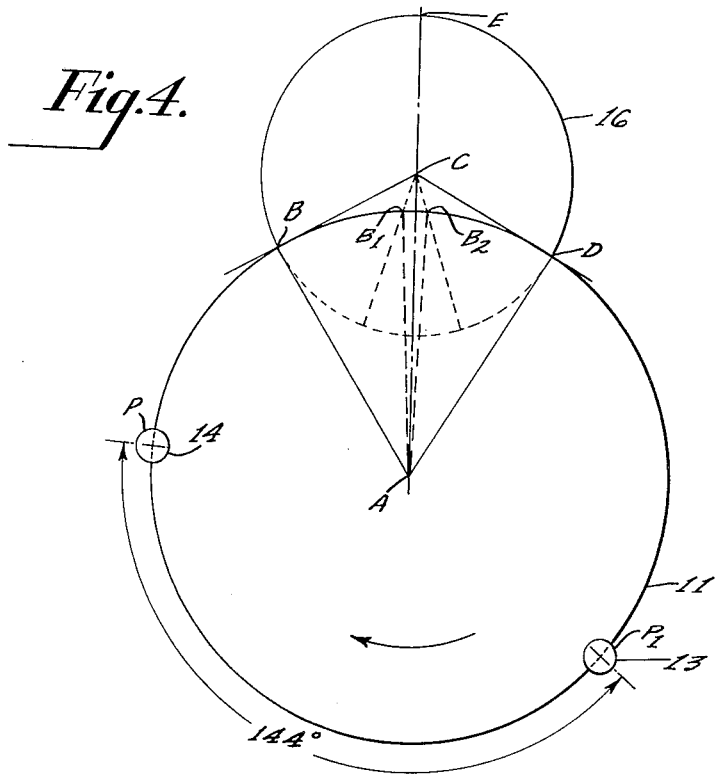
Fig. 4 is a graph showing the action of the Geneva portion of the invention.

Referring now to the drawings, in which the same numerals identify like elements, the mechanism is driven by a constant speed belt 5 of the rubber toothed type, over a sprocket 6. The sprocket is on a shaft 7 with a collar 8 and extends within a casing 10 and on which is a pin wheel 11. The wheel 11 has two pins 13 and 14 extending therefrom (see Fig. 4), these pins being spaced 144 and 216 degrees apart. The pins are adapted to enter and depart from the slots or grooves of a star wheel 16, which has three equally spaced slots therein. The pin wheel 11 and star wheel 16 comprise the Geneva portion of the mechanism.

On the shaft 17 of the star wheel 16 is a herring bone gear 18 in mesh with a herring bone gear 19 on a shaft 20. These gears are preferably of nylon because of the high ratio between sheer strength of the teeth and mass of the gears and because they are light in weight with a low rotational inertia. They are somewhat resilient and ease the shock load on the Geneva. The ratio of gear 18 to gear 19 is three to one. Also, on shaft 20, is a flat cam 22 attached to collar 23 and a triangular constant diameter cam 25, this triangular cam being within a shuttle 26. The cam 25 provides the film pull-down cycle and may be considered as the up-and-down cam, and the cam 22, the in-and-out motion of the film pull-down claw.

Fixedly attached to shuttle 26 is a hollow rod 28 which is slidable and rotatable in a bearing plate 29. At the upper end of the rod 28 there is attached a claw member 31 having right angle teeth 32 and 33, which are adapted to enter and be withdrawn from the perforations 34 of a film 35 as the rod is alternately rotated. The shuttle rod 28 is hollow to reduce inertia, and serves as the pivot around which the in-and-out motion of the claw takes place. The rod is attached to the shuttle in such a location that the force of the pull-down from the cam 25 is exerted directly in line with the rod, which prevents moment arms and avoids binding. This reduces wear and flexing of the parts and prevents breakage. Stops, not shown, are provided to prevent the claw from overshooting when it is withdrawn from the film.

Rotation of cam 25 provides the advancement of the film, while cam 22 moves the teeth 32 and 33 in and out of the film. The latter action is accomplished by the cam follower 37 on rod 38 attached to linkage 39 on shuttle 26. This mechanism is spring loaded by spring 41. By limiting the shuttle movement, a light spring may be used which prevents excessive loading of the intermittent. All the moving elements from pin wheel to cam 25 operate in a live spray of lubricant.

Figure 6:
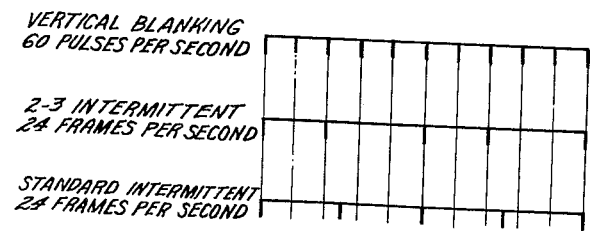
Fig. 6 is a graph showing the relationship between the vertical blanking pulses and the film advancing periods.

Referring now to Fig. 6, the non-compatibility between the sixty per second vertical blanking pulses and the standard motion picture periods of twenty-four frames per second and the compatibility between the sixty per second vertical blanking pulses and the 2–3 intermittent at twenty-four frames per second are shown. It is noted that the pull-down shown by the short heavy lines for the 2–3 intermittent occurs only during the blanking times, while some of the pull-downs for the standard intermittent occur during the scanning times. Since the pins 13 and 14 are spaced as shown in Fig. 4, the 2–3 intermittent periods are obtained. The belt sprocket 6 is driven at 720 R. P. M. or 12 R. P. S., which is the speed of the pin wheel 11. Since only two pins are used per revolution of the pin wheel and the star wheel 16 has three grooves therein, the star wheel intermittently rotates at an average speed of 8 R. P. S. Of course, the gear 18 has the same form of speed. Since the ratio between gears 18 and 19 is three to one, gear 19 intermittently rotates at an average speed of 24 R. P. S., which is also the rotational speed of cams 22 and 25. Thus, the claw teeth 32 and 33 advance the film intermittently at 24 frames per second in a 2–3 order, as shown in the central portion of Fig. 6.

Figure 5:
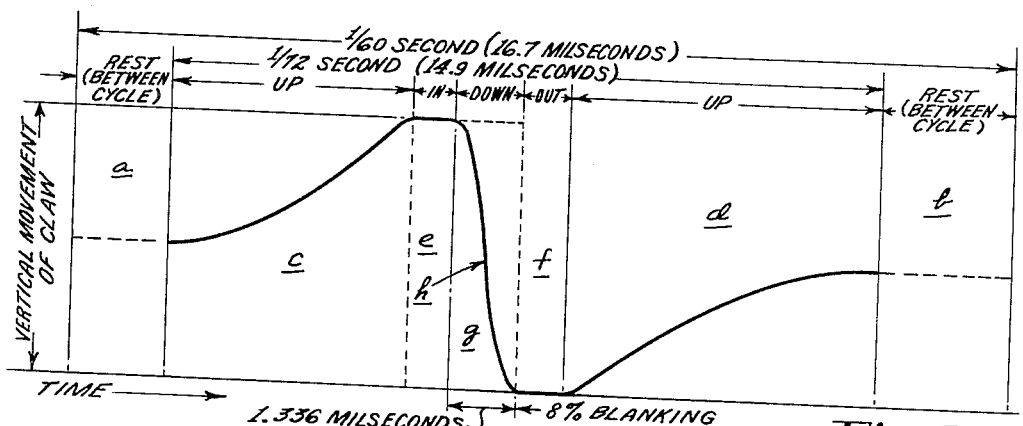
Fig. 5 is a graph showing a complete cycle of the pull-down claw.

To illustrate a complete pull-down cycle or the displacement of claw 32—33 for one revolution of cams 22 and 25, reference is made to Fig. 5, wherein the rest periods are shown at $a$ and $b$, the two up periods at $c$ and $d$, the in-and-out periods of the claw teeth at $e$ and $f$, respectively, and the pull-down period at $g$. The point $h$ is the highest point of peak velocity and speed. The peak rotational speed amassed by the cam 25 at this point is approximately 13,956 R. P. M., while the linear velocity of the claw is approximately 359 inches per second.

By reference to Fig. 4, the time of the pull-down can be calculated. The pin wheel circle is shown with its center at A, and the star wheel circle has its center at C. The pins P and $P_1$ are shown with their centers on the pin wheel circle. The lines BC, DC, and EC represent the three grooves or slots of the star wheel, each groove being 120 degrees from the others, making the right triangles ABC and ACD. Thus, if AB is 1, AC is 2 divided by the square root of 3, or 1.1547.

The smallest possible rotation of the pin wheel to produce forty degrees' rotation of the star wheel after pin P has entered slot CB, will be equally divided about centerline AC, or, it occurs while slot BC is passing from $B_1$ to $B_2$. Angle $B_1CA$ is twenty degrees and its opposite side is 1, and although angle $AB_1C$ is not known, its opposite side is 1.1547. Now, by the laws of sines, it is found that the angle of rotation of the pin wheel to produce twenty degrees' rotation of the star wheel is three degrees, fifteen minutes. This is one-half the pull-down angle, the full angle being six degrees, thirty minutes. However, since the film is allowed to overshoot .003 inch, the claw moves this distance before it contacts the film. Using these figures, it is found that eight percent vertical blanking time of a television system is eleven degrees, thirty-two minutes of the twenty-four cycles per second film system.

To improve film life and film steadiness in a rapid film pull-down mechanism as described above, the teeth 32 and 33 of the claw are constructed as disclosed and claimed in my copending application, Serial No. 290,442, filed May 28, 1952.

I claim:

1. An intermittent film pull-down mechanism for advancing a motion picture film at the rate of substantially 1.336 milliseconds per frame comprising a pin wheel—star wheel mechanism, means for driving said pin wheel at a substantially constant speed, a pair of cams, a common shaft for said cams, gear means interconnecting said star wheel and said shaft, and a shuttle and claw mechanism connected to said cams and actuated thereby, said shuttle and claw mechanism being given a rectilinear motion by one of said cams and a rotary motion by the other of said cams perpendicular to said first-mentioned motion.

2. An intermittent film pull-down mechanism in accordance with claim 1, in which said pin wheel continuously rotates at twelve R. P. S., said star wheel intermittently rotates at an average speed of eight R. P. S., and said cam shaft intermittently rotates at an average speed of twenty-four R. P. S.

3. An intermittent film pull-down mechanism in accordance with claim 1, in which said pin wheel continuously rotates at twelve R. P. S., said star wheel being rotated intermittently two-thirds of a revolution per revolution of said pin wheel, said pin wheel having two pins spaced 144 and 216 degrees apart.

4. An intermittent film pull-down mechanism in accordance with claim 1, in which said shuttle and claw mechanism includes a shuttle actuated by one of said cams for advancing film, and a spring loaded pin actuated by said other cam for advancing and retracting said claw to and from said film.

5. An intermittent film advancing system for advancing at a high pulldown speed twenty-four frames of film per second in a 2–3 ratio, comprising a continuously driven pin wheel, pins on said wheel spaced 144 and 216 degrees apart, a triple slotted star wheel actuated by said pins, a shaft driven by said star wheel at triple the speed of said star wheel, cams on said shaft, a shuttle bodily translated in a rectilinear direction by one of said cams and vibrated in a rotary direction at substantially right angles to said first direction of translation of said shuttle by another of said cams; and a film claw connected to said shuttle.

6. An intermittent film advancing system in accordance with claim 5, in which said pin wheel rotates at twelve R. P. S., said star wheel at an average speed of eight R. P. S., and said cam shaft at an average speed of twenty-four R. P. S.

7. An intermittent film advancing system in accordance with claim 5, in which said first mentioned cam translates said shuttle in one direction in substantially the same time period as that of the vertical blanking time period of a thirty frame television system.

8. An intermittent film advancing system in accordance with claim 5, in which said first mentioned cam translates said shuttle in one direction in substantailly 1.336 milliseconds.

9. An intermittent film advancing system for advancing film at a high pulldown speed comprising a continuously driven pin wheel, a pair of pins on said wheel, a star wheel having slots therein, said star wheel being intermittently driven when one of said pins passes in and out of one of said grooves, a shaft for said star wheel, a second shaft, intermeshing gears on said shafts, a pair of cams on said second shaft, a shuttle on one of said cams, said cam translating the position of said shuttle rectilinearly, and connecting means between said shuttle and said other cam for vibrating said shuttle in a rotary motion substantially perpendicular to said motion of translation of said shuttle.

10. An intermittent film advancing system in accordance with claim 9, in which a film moving claw is provided on said shuttle and said connecting means includes a spring loaded pin actuated by said other cam.

11. An intermittent film advancing system in accordance with claim 10, in which a rod interconnects said claw and shuttle, said rod being moved axially by said shuttle for moving said claw to advance said film, said rod forming a pivot about which said claw is rotatable for moving said claw in and out of said film by said spring loaded pin connected to said shuttle.

References Cited in the file of this patent

UNITED STATES PATENTS

| 1,480,864 | Reed | Jan. 15, 1924 |
| 2,027,678 | Debrie | Jan. 14, 1936 |
| 2,051,602 | Holden | Aug. 18, 1936 |
| 2,415,390 | Konkle | Feb. 4, 1947 |
| 2,475,622 | Kuehn | July 12, 1949 |
| 2,594,466 | Luther | Apr. 29, 1952 |

FOREIGN PATENTS

| 988,723 | France | May 9, 1951 |